United States Patent
Nakagawa et al.

(10) Patent No.: US 6,697,425 B1
(45) Date of Patent: Feb. 24, 2004

(54) DYNAMIC IMAGE ENCODING APPARATUS AND METHOD FOR ENCODING A DYNAMIC IMAGE

(75) Inventors: Akira Nakagawa, Kawasaki (JP); Eishi Morimatsu, Kawasaki (JP); Taizo Anan, Kawasaki (JP); Wolfgang Niem, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/450,061

(22) Filed: Nov. 29, 1999

(51) Int. Cl.[7] .................................................. H04B 1/66
(52) U.S. Cl. ............. 375/240; 375/240.23; 375/240.24; 375/240.18; 375/240.03; 382/246; 382/250; 382/251; 382/248
(58) Field of Search ............................ 375/240, 240.15, 375/240.24, 240.18, 240.23, 240.03; 348/409, 411, 402, 423, 420, 422, 414; 382/250, 251, 253, 246, 240

(56) References Cited

U.S. PATENT DOCUMENTS

| 5,089,889 A | * | 2/1992 | Sugiyama .................... 348/409 |
| 5,278,647 A | | 1/1994 | Hingorani et al. ..... 375/240.15 |
| 5,414,469 A | | 5/1995 | Gonzales et al. ....... 375/240.18 |
| 5,440,345 A | * | 8/1995 | Shimoda ..................... 348/411 |
| 5,786,858 A | | 7/1998 | Yakasaki et al. ........ 375/240.15 |
| 5,926,226 A | * | 7/1999 | Proctor et al. .............. 382/253 |

\* cited by examiner

*Primary Examiner*—Shawn S. An
(74) *Attorney, Agent, or Firm*—Katten Muchin Zavis Rosenman (57) ABSTRACT

The present invention discloses a dynamic image encoding apparatus and a method for encoding a dynamic image in which the dynamic image is divided into data blocks, the data blocks are encoded, and then block division information including a size of a picture or a size of the encoded data blocks is inserted at a position after a synchronous code in a header of each group including a plurality of the encoded data blocks when the groups are transmitted.

10 Claims, 9 Drawing Sheets

SUCCESSFUL IMAGE DECODED BY CIF

FAILED IMAGE DECODED BY CIF

SUCCESSFUL TRANSMISSION ↑

HEADER TRANSMISSION ERROR ↑

FIG.5A PRIOR ART

FRAME(t):CIF

FRAME(t+1):AnnexQ

DYNAMIC IMAGE ENCODING APPARATUS AND METHOD FOR ENCODING A DYNAMIC IMAGE

BACKGROUND OF THE INVENTION

1. Field of the Invention

The present invention generally relates to dynamic image encoding apparatuses and methods for encoding a dynamic image that achieve a high encoding ratio and prevent image quality from being deteriorated by decoding and reproducing.

In order to transmit or store dynamic images, an encoding technology is desired in which a high compression rate is achieved without causing deterioration of images from reproduction. In addition, excellent recovery from a transmission error is desired. Thus, the present invention provides a dynamic image apparatus and a method for encoding a dynamic image that can realize the above technologies.

2. Description of the Related Art

Such a dynamic image encoding technology is described, for example, in ITU-T (International Telecommunication Union—Telecommunication Standardization Sector) H.263, the disclosure of which is hereby incorporated for reference. This is called a dynamic image hybrid encoding method. Also, Annex K, Annex Q and Annex P are known as ITU-T H.263.

Figure 1:
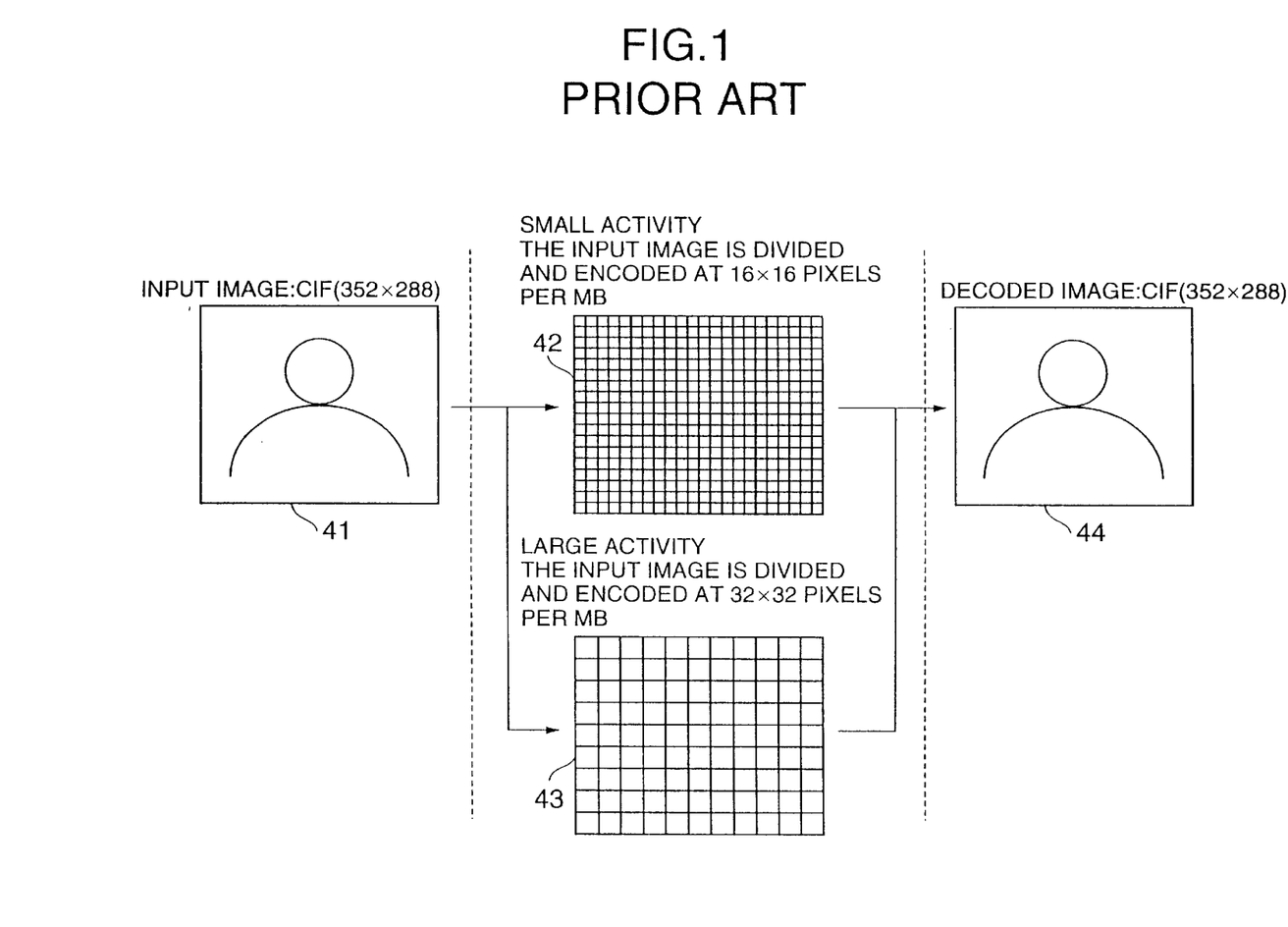
FIG. 1 is a diagram for briefly explaining ITU-T H.263 Annex Q.

FIG. 1 is a diagram for briefly explaining ITU-T H.263 Annex Q. In FIG. 1, when a picture changes slowly, that is, when activity (motion activity) is small, an input image 41 composed of 352×288 pixels CIF (Common Intermediate Format) is divided and encoded at 16×16 pixels per macroblock (MB) so as to be encoded to an image 42. In this case, the input image 41 is divided into macroblocks of 22 columns×18 rows and then these macroblocks are encoded with motion compensations.

When the picture changes quickly, that is, when activity is large, a large volume of information is incurred. Thus, the input image 41 is divided and encoded at 32×32 pixels per MB so as to be an image 43. In this case, the input image 41 is divided into macroblocks of 11 columns×9 rows. Then, these macroblocks, which volume is reduced to half volume, are encoded with motion compensations.

In this case, the motion compensation is performed for each macroblock composed of 32×32 pixels. Down-sampling corresponding to 16×16 pixels is performed for an estimation error of a macroblock composed of 32×32 pixels. Then, a DCT (discrete cosine transform), a quantization and a variable length coding are performed on the reduced estimated error. In this method, it is possible to maintain a high resolution for static background images. Also, it is possible to perform the down-sampling only for motion fields (dynamic image areas) and then to encode reduced motion fields. Thereafter, image information including block division information is transmitted. When the image information of the input image 41 is received at a receiver side, the image information is decoded so as to be a decoded image 44 composed of 352×288 pixels CIF as shown in FIG. 1.

Figure 2:
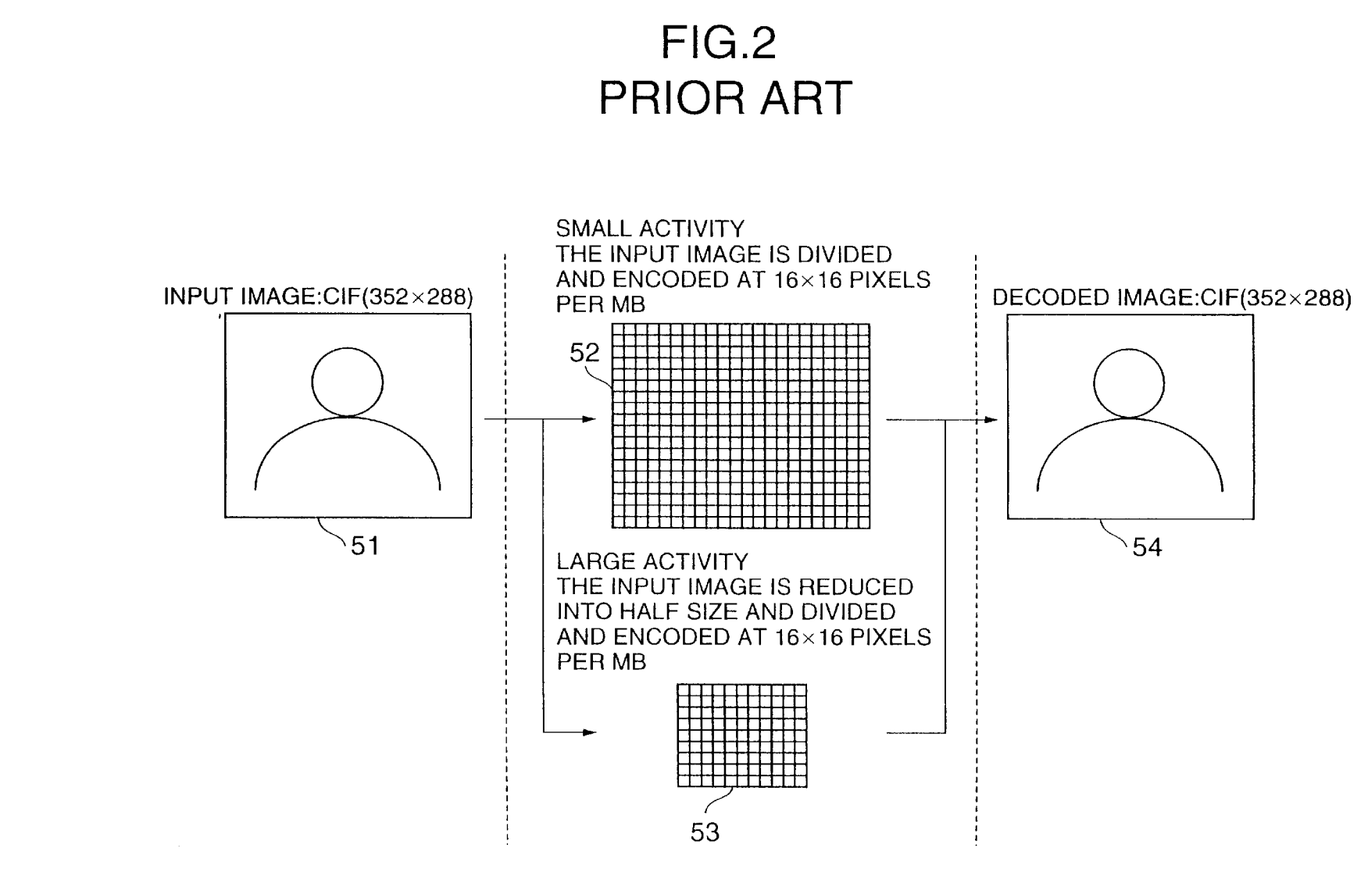
FIG. 2 is a diagram for briefly explaining ITU-T H.263 Annex P.

FIG. 2 is a diagram for briefly explaining ITU-T H.263 Annex P. In FIG. 2, when a picture changes slowly, an input image 51 composed of 352×288 pixels CIF is divided and encoded at 16×16 pixels per macroblock to form an image 52 in the same manner as Annex Q. When the picture changes quickly, the input image 51 is reduced so as to be an image 53 composed of 176×144 pixels QCIF. The image 53 is further divided and encoded at 16×16 pixels per MB. In this case, the encoded image has a different size from that of the reduced image. Thus, an estimated image is obtained by regenerating the original size. Also, when image information of the input image 51 is received at the receiver side, the image information is decoded based on CIF or QCIF information so as to be a decoded image 54 composed of 352×288 pixels CIF as shown in FIG. 2.

As mentioned above, when the activity is small, the input image is encoded at a high resolution. On the contrary, when the activity is large, an overload of information is prevented by a division of information into smaller blocks or by reducing the volume of information of the input image. Thus, in order to avoid such an overload of information, the input image is divided by large blocks or the input image is reduced. Thereafter, the input image is encoded at a low resolution.

Figure 3A:
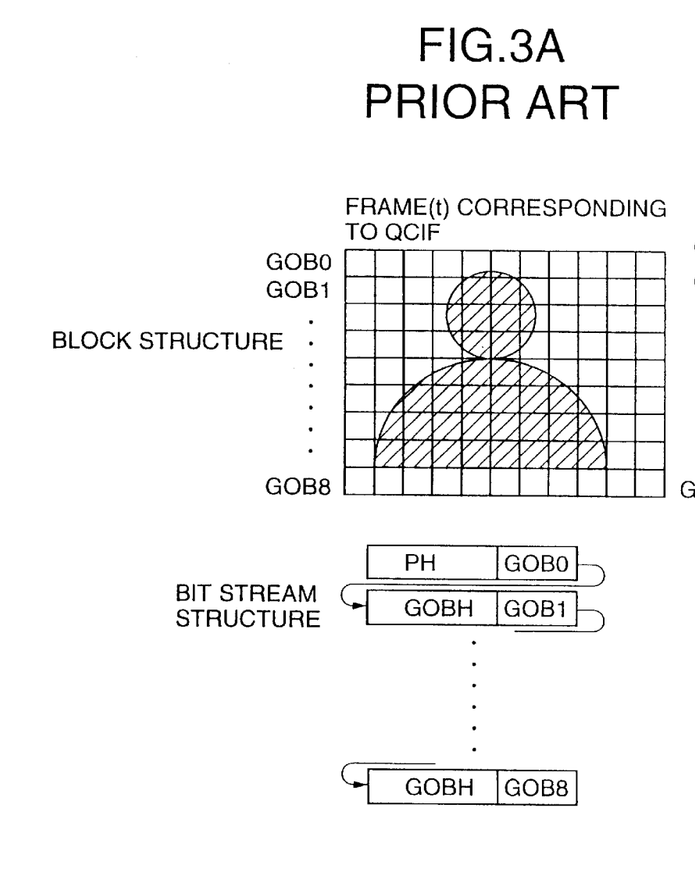
FIG. 3A is a diagram showing an image corresponding to QCIF after being reduced or divided and FIG. 3B is a diagram showing an image corresponding to QCIF after being divided.

A block structure and a bit stream structure will be now explained. When the activity is large in a frame (t), the input image is reduced or divided by a large block. An image corresponding to QCIF after being reduced or divided is shown in FIG. 3A. In this case, the input image is divided into 9 rows×11 columns of macroblocks. Thereafter, encoded macroblocks on each macroblock line are grouped to compose a GOB (Group Of Blocks). In this example, the divided image has 9 rows. Thus, the divided image is scanned along each row so as to produce 9 block groups of data, GOB0 through GOB8.

In this case, the bit stream structure is composed of PH, GOB0, GOBH, GOB1, GOBH, GOB2, . . . , GOBH and GOB8. It should be noted that the PH means a picture header and the GOBH means a block group header. That is, a picture header PH is added at the beginning of GOB0. Also, block group headers GOBH are added at the beginning of the other block groups of data GOB1 through GOB8.

Figure 3B:
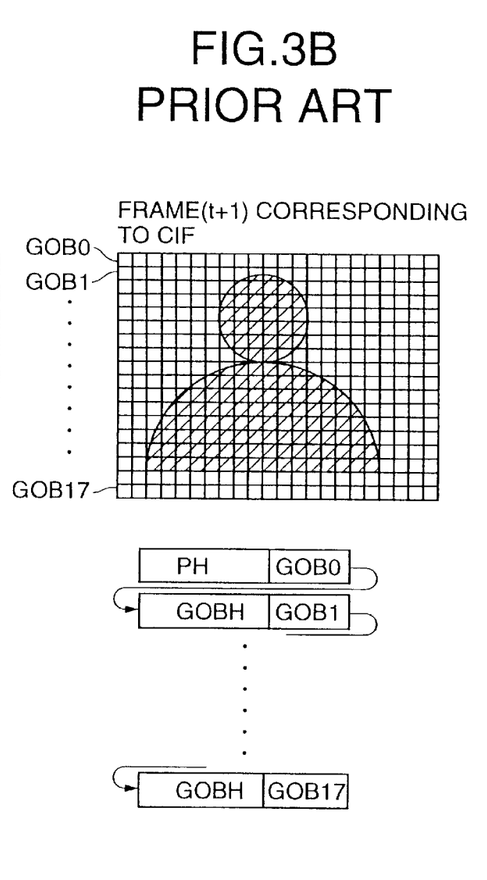

When the activity is small in a frame (t+1), the input image corresponding to the CIF is divided by a small block. An image corresponding to QCIF after being divided is shown in FIG. 3B. In this case, the input image is divided into 18 rows×22 columns of macroblocks. Thereafter, data of encoded macroblocks at a macroblock line is grouped so as to produce 18 block groups of data, GOB0 through GOB17. In this case, the bit stream structure is composed of PH, GOB0, GOBH, GOB1, GOBH, GOB2, . . . , GOBH and GOB17.

Figures 4A, 4B:
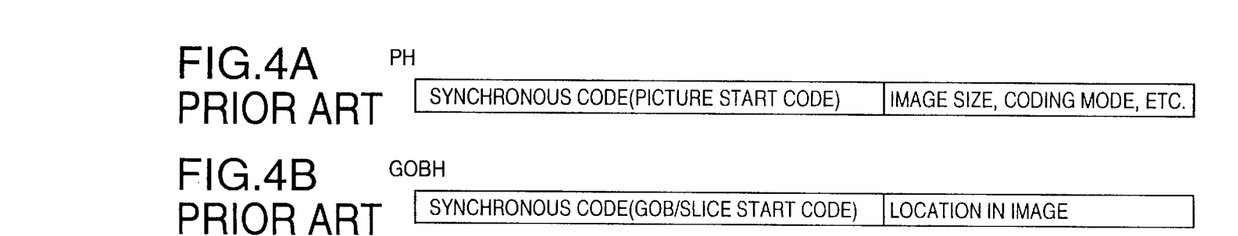
FIG. 4A is a diagram showing a picture header PH.
FIG. 4B is a diagram showing a block group header GOBH.

The picture header and the block group header will be now explained. FIG. 4A is a diagram showing a picture header PH. The picture header PH includes a synchronous code (Picture Start Code), an image size, a coding mode and so on. FIG. 4B is a diagram showing a block group header GOBH. The GOBH includes a synchronous code (GOB/Slice Start Code) and location information in an image.

Figure 4C:
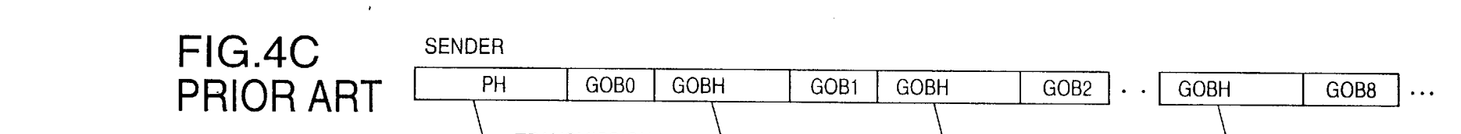
FIG. 4C is a diagram showing a bit stream from a sender.
Figure 4D:
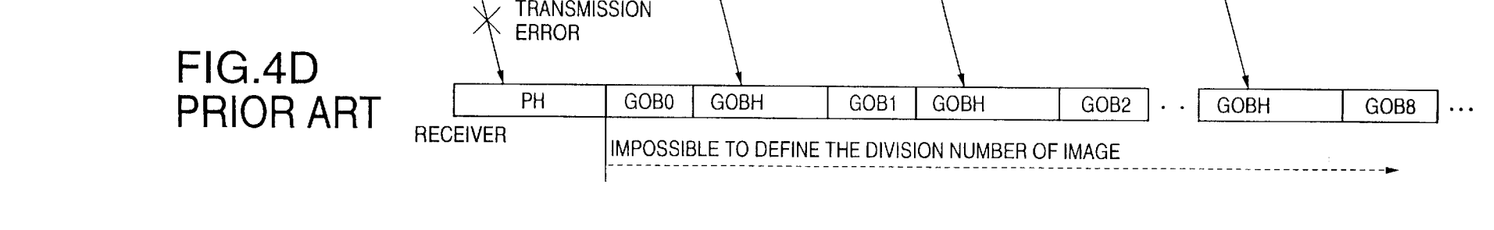
FIG. 4D is a diagram showing a bit stream from a receiver.
Figure 4E:
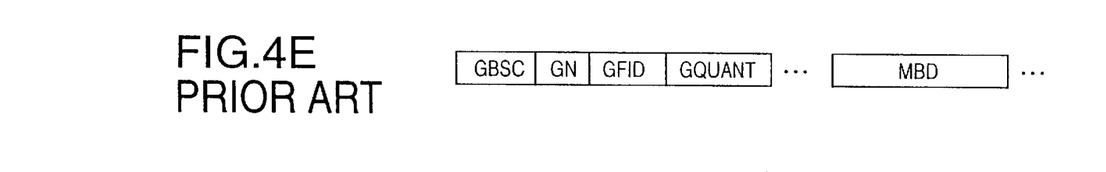
FIG. 4E is a diagram showing a block group header GOBH being in conformity to H.263.

FIG. 4C is a diagram showing a bit stream from a sender and FIG. 4D is a diagram showing a bit stream from a receiver. And FIG. 4E is a diagram showing a block group header GOBH which is in conformity to H.263. In FIG. 4E, the block group header GOBH includes the following codes: A GBSC is a unique synchronous code shown as "0000 0000 0000 0000 1". A GN is a block group (GOB) number composed of 5 bits. A GFID is an ID number of the block group GOB. A GQUANT shows a default value for a quantization of this block group GOB. An MBD is a block group of data.

When the receiver normally receives the bit stream from the sender as shown in FIG. 4C, the receiver can recognize all information in the bit stream, including the image size of the picture header PH, the coding mode and so on. Thus, it is possible to successfully decode all information of the bit stream and reproduce one screen composed of a plurality of macroblock lines at the receiver side. Accordingly, an image successfully reproduced is displayed. However, when the receiver can not receive the picture header PH because of an occurrence of a transmission error, it may be impossible for the receiver to get information of the image size, a coding mode and so on. As a result, it is impossible to define the division number of an image that shows how many macroblocks the image is divided into. That is, even if the receiver obtains the image, the receiver can not recognize the number of macroblock lines composing one screen. In this case, it fails to decode and reproduce the image received at the receiver side.

Recently, in wireless mobile communication, it is possible to encod a dynamic image by such as a hybrid encoding method and transmit the encoded dynamic image. In such a mobile communication system that has improved to achive practical use, such as IMT-200, a maximum 2-Mbps transmission is realized. With regard to this transmission performance, it is easily realized to transmit encoded information of a dynamic image to a portable personal computer. However, because a frequency band having a few GHz within wireless frequency bands is used for the wireless mobile communication, there are disadvantages that instability of a wireless transmission path occurs by phasing or the like and also noise occurs easily.

Figure 5A:
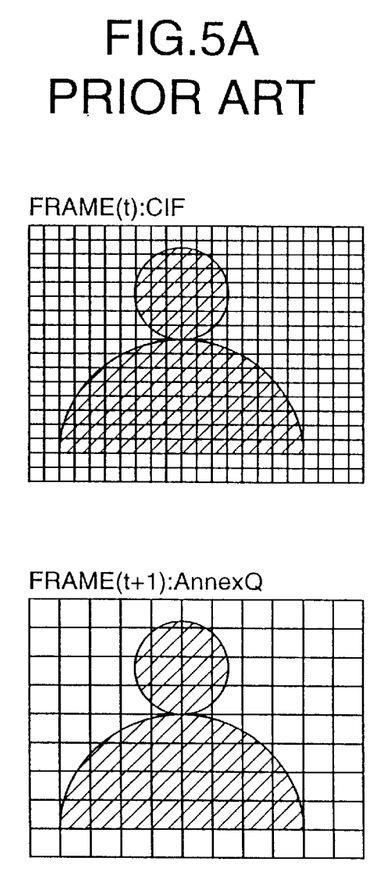
FIG. 5A is a diagram showing an image divided by a macroblock before encoding at the sender side and FIG. 5B is a diagram showing an image decoded corresponding to a macroblock at the receiver side.
Figure 5B:
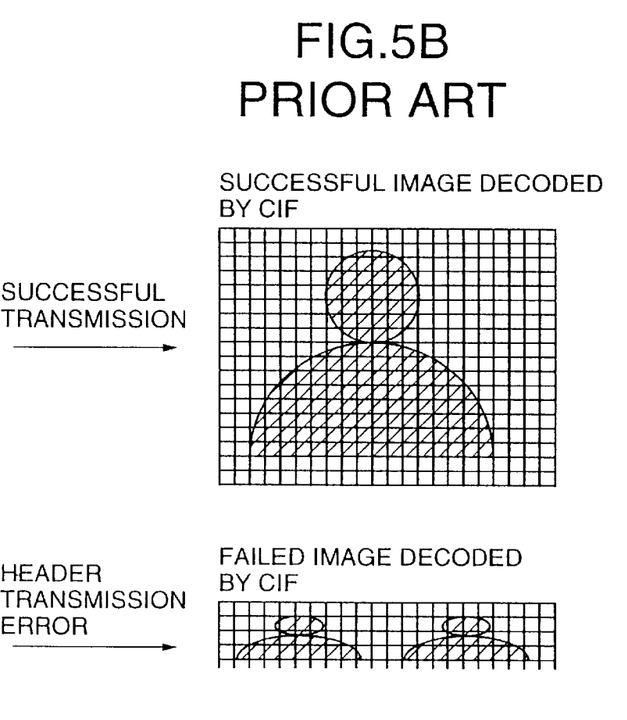

Consequently, such a transmission error as shown in FIGS. 4C and 4D may occur. Accordingly, the transmission error deteriorates remarkably an image quality after an image is encoded and reproduced. For example, FIG. 5A is a diagram showing an image divided by a macroblock before encoding at the sender side. FIG. 5B is a diagram showing an image decoded corresponding to a macroblock at the receiver side. When a frame (t) of a CIF image from the sender is received without any transmission error at the receiver side, the frame (t) is successfully decoded and reproduced.

However, when activity is large in a frame (t+1), the frame (t+1) is divided by a large macroblock or the size of the frame (t+1) is reduced so that a QCIF image is obtained. In this case, when the receiver can not recognize the information of the image size and so on in the picture header PH because of a transmission error, a reduced image as shown as a lower image in FIG. 5B is encoded. That is, at the receiver side, a 32×32 pixel macro block is recognized as a 16×16 pixel macro block and decoded as a 16×16 pixel macro block, or the QCIF image is recognized as a CIF image and decoded as a CIF image. As a result, the received image is decoded without being enlarged. Consequently, such an image shown as the lower image in FIG. 5B is reproduced. Disadvantageously, in this method, a transmission error causes remarkable deterioration of reproduced image quality.

SUMMARY OF THE INVENTION

It is a general object of the present invention to provide a dynamic image encoding apparatus and a method for encoding a dynamic image in which resolution and size of an image are properly changed and encoded and the above-mentioned problems are eliminated.

A more specific object of the present invention is to provide a dynamic image encoding apparatus and a method for encoding a dynamic image which are capable of preventing image quality from being deteriorated by decoding and reproducing when a transmission error occurs.

The above objects of the present invention are achieved by a dynamic image encoding apparatus including an encoding part dividing each picture of an input image into a plurality of blocks and encoding each of the blocks into an encoded data block; and a control part determining at least one of a size of the picture and a size of the blocks so as to avoid an occurrence of an overload of information, the control part controlling the encoding part so as to make groups by grouping by a plurality of the encoded data blocks and add a header including a synchronous code at the head of each of the groups to be transmitted, wherein the encoding part inserts block division information indicating one of the size of the picture and the size of the blocks at a position after the synchronous code in the header of each of the groups.

According to the present invention, the block division information is inserted into the header of each of the groups. Therefore, even if the header of the first group can not be recognized at a receiver side because of a transmission error, it is possible to successfully decode the encoded data blocks in the groups when the header of one of the groups is recognized at the receiver side.

The above objects of the present invention are achieved by a method for encoding a dynamic image including the steps of: dividing each picture of an input image into a plurality of blocks and encoding each of the blocks into an encoded data block; determining at least one of a size of the picture and a size of the blocks so as to avoid an occurrence of an overload of information; making groups by grouping by a plurality of the encoded data blocks; adding a header including a synchronous code at the head of each of the groups to be transmitted; and inserting block division information indicating one of the size of the picture and the size of the blocks at a position after the synchronous code in the header of each of the groups.

According to the present invention, the block division information is inserted into the header of each of the groups. Therefore, even if the header of the first group can not be recognized at a receiver side because of a transmission error, it is possible to successfully decode the encoded data blocks in the groups when the header of one of the groups is recognized at the receiver side.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 6:
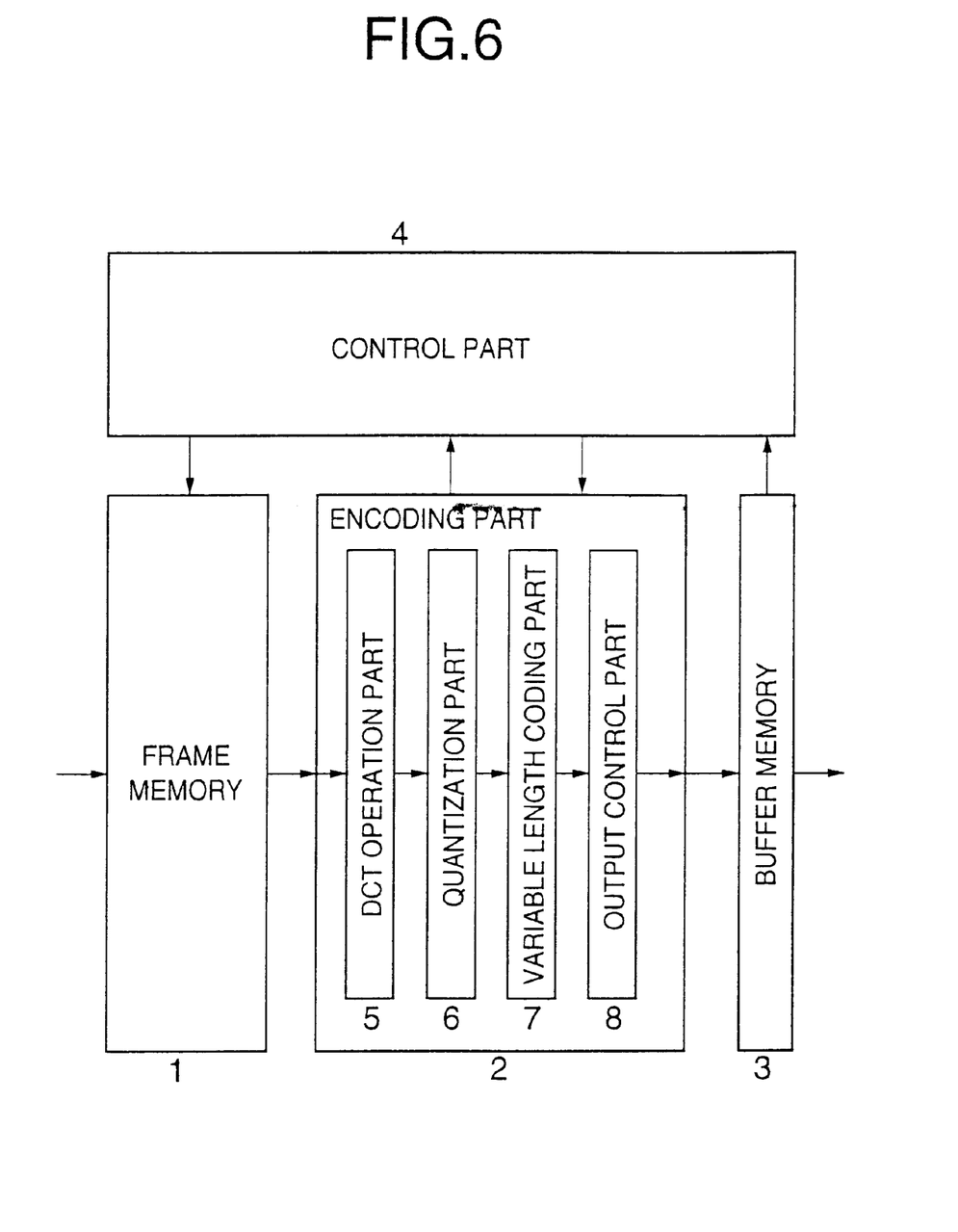
FIG. 6 is a diagram for explaining an embodiment according to the present invention.

FIG. 6 is a diagram for explaining an embodiment according to the present invention. In this embodiment, a dynamic image encoding apparatus according to the present invention includes a frame memory 1, an encoding part 2, a buffer memory 3 and a control part 4. An input image from a television camera or the like is stored in the frame memory 1 and transferred to the encoding part 2 by the control part 4.

Further, the encoding part 2 includes a DCT operation part 5, a quantization part 6, a variable length coding part 7 and an output control part 8. A DSP (Digital Signal Processor), for example, can realize the above functions. The input image is divided into a plurality of macroblocks and a motion vector corresponding to each macroblock is calculated. Also, an estimated error is calculated for the motion vector. Then, a discrete cosine transform is performed in the DCT operation part 5. Further, the quantization is performed in the quantization part 6. Furthermore, a quantized output is processed in the variable length coding part 7. Subsequently, a bit stream, in which a picture header and a block group header are added to the beginning of a block group of data, is constructed by the output control part 8 and is inputted in the buffer memory 3. The control part 4 controls the buffer memory 3 to read out and transmit the bit stream at an even speed corresponding to a transmission speed.

The control part 4 determines the volume of the activity based on the estimated error and an amount of data stored in the buffer memory 3. Based on a result of the determination, the control part 4 switches a coding mode of the image to a CIF image or a QCIF image and also defines the size of a macroblock to divide the image. Then, the output control part 8 adds block division information including the image size, a coding mode and resolution information to the picture header. Also, the output control part 8 adds the same information to each block group header. Thus, even in a case as shown in FIG. 4C in which the image size, the coding mode and so on can not be recognized at the receiver side because of a transmission error of the picture header PH, it is possible to properly decode the bit stream which includes this picture header PH if a next block group header is successfully received at the receiver side. It should be noted that a dynamic image decoding apparatus processes each function as mentioned above in a reverse order of processes for the dynamic image encoding apparatus. Hence, it is possible to decode encoded image information at the receiver side.

Figure 7A:
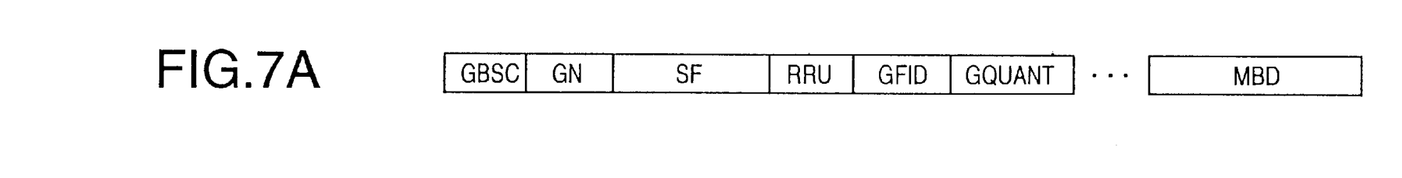
FIG. 7A is a diagram showing a case in which block division information is added to each block group header and FIG. 7B is diagram showing another case in which the block division information is added to some of the block group numbers.

A transmission format according to the embodiment of the present invention will now be explained. FIG. 7A is a diagram showing a case in which block division information is added to each block group header. In FIG. 7A, a GBSC, a GN, a GFID, a GQUANT and an MBD are the same as those shown in FIG. 4E, that is, a synchronous code, a block group (GOB) number, a block group (GOB) ID number and a default value of a quantizer for a current block group (GOB). And, an SF (Source Format) is format information indicating the image size and a RRU (Reduced Resolution Update) is a bit showing whether the RRU mode indicating resolution in conformity to the H263 Annex Q is available or not.

In accordance with control of the control part 4, the output control part 8 adds the block division information including the SF bit indicating the image size and the resolution showing whether the RRU mode is available or not, which are defined in the picture header, to each block group header after the block group number GN. In this manner, even when it is difficult to recognize a plurality of block group headers at the receiver side because of deterioration of wireless communication, the image size can be recognized if at least one block group header is received. Therefore, it is possible to decode all block groups of data MBD after the received block group header.

Figure 7B:
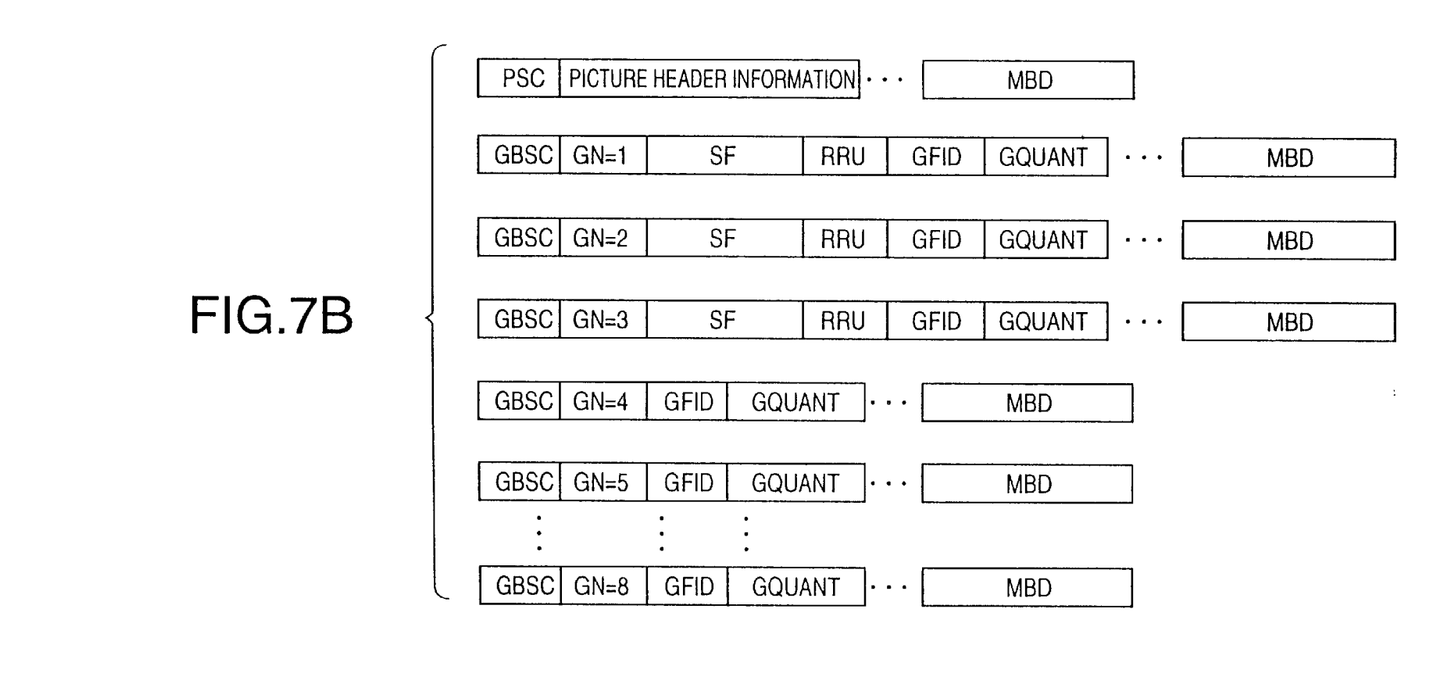

Alternatively, for example, in FIG. 7B, the SF bit and the RRU bit are added to the block group numbers GN1 through GN3 of the block group numbers GN0 through GN8 instead of all block group numbers. A picture header PSC (Picture Start Code) is a synchronous code.

In this case, one picture is composed of 9 block groups of data MBD. The block division information including the SF bit and the RRU bit are added to the first four block groups of data MBD. It is assumed that the SF bit and the RRU bit in each of the picture header and block group numbers GN1 and GN2 can not be recognized because of a transmission error caused by such as a burst condition. In this embodiment, however, it is possible to decode block groups of data MBD after a block group number GN2 if the SF bit and RRU bit in the following block group number GN3 is recognized. According to this example, the block division information may be added into headers of a plurality of predetermined block group numbers GN.

That is to say, in a case in which the block division information is added to all of the picture header PH and block group headers for one picture frame, a transmission performance may be influenced and deteriorated. Hence, as shown in FIG. 7B, by adding the block division information to not all but some block group headers, it is possible to suppress the influence on the transmission performance. In addition, it is possible to prevent a transmission error from deteriorating an image quality of an image that is to be decoded and reproduced at the receiver side.

Figure 8A:
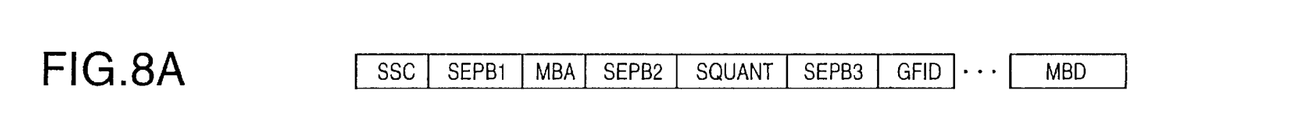
FIG. 8A is a diagram showing a transmission format defined in H.263 Annex K.

A transmission format according to another embodiment of the present invention will now be explained. FIG. 8A is a diagram showing a transmission format defined in H.263 Annex K. In FIG. 8A, an SSC is a slice start code. An SEPB1 is a bit guaranteeing that the slice start code is unique and is always set to "1". An MBA is a macroblock address. An SEPB2 is a bit guaranteeing that the slice start code is unique and is always set to "1". An SQUANT is a default value of a quantizer for a current slice. A GFID is a slice ID number. An SEPB3 is a bit guaranteeing that the slice start code is unique and is always set to "1". An MBD is block data.

As is mentioned in the above embodiment, the size of a macroblock to divide an input image is fixed at such as 16×16 pixels or 32×32 pixels per macroblock for one picture. Instead, in H.263 Annex K, it is allowed to define any number of macroblocks in a slice along a scanning direction. Accordingly, in a case in which an activity is small, it is possible to make the number of macroblocks in a slice larger. Then, in a slice header that corresponds to a block group header, a macroblock address MBA is added at the head of the slice. Also, a picture header is added to the first block group of data corresponding to one picture and then a bit stream including the picture header and block groups of data is transmitted.

Figure 8B:
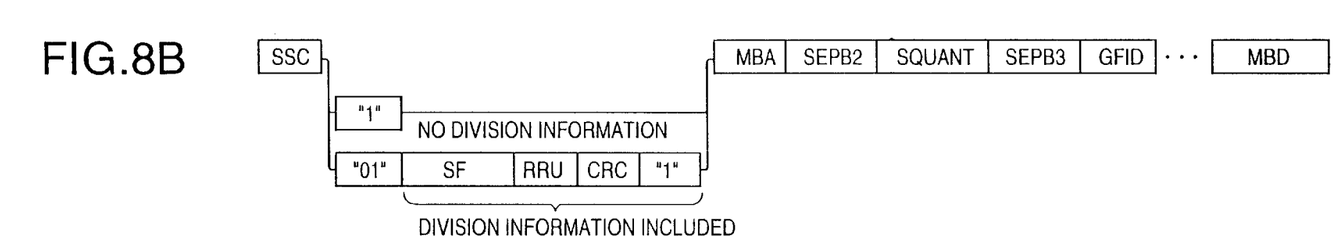
FIG. 8B is a diagram showing a case in which Annex K is applied to the embodiment of the present invention.

In FIG. 8B, Annex K as mentioned above is applied to the embodiment of the present invention. When the division information is not necessary, the SEPB1 bit just after the slice start code SSC is set to "1". In this case, a structure of the slice header is the same as the structure shown in FIG. 8A. On the other hand, when the division information is included, the SEPB1 bit just after the slice start code SSC is set to "01". In this case, the SF bit indicating the image size related to a block division, the RRU bit indicating whether the RRU mode is available or not, an error check code CRC and a value "1" as a fixed code are added. That is, the block division information comprised of "01", SF, RRU, CRC and "1" is inserted between the slice start code SSC and the macroblock address MBA.

The error check CRC is used to check an error of SF or RRU included in the block division information. For example, a generator polynominal $X^4+x^3+x^2+1$ may be used to check an error, or an error correction code such as a BHC code may be used. Although the error correction code makes the division information longer in length, the error correction code makes it possible to properly obtain information.

The macroblock address MBA includes a field length of the block division information. Thus, when the block division information can not be obtained at the receiver side, it may be recognized that the macroblock address MBA has an incorrect data length. In this case, a coded image data is of a variable length. Therefore, a reproduced image resulting from decoding the whole coded image data can not be recognized as the original image completely.

Disadvantageously, when the picture header can not be recognized by a transmission error, a deterioration of an image quality after decoding and reproducing as mentioned above occurs. Accordingly, as shown in FIG. 8B, the block division information is added before the macroblock address MBA. The block division information may be added after each slice start code SSC. Or, the block division information may be added into headers of a plurality of predetermined block group numbers GN or at predetermined positions after each slice start code SSC.

Figure 8C:
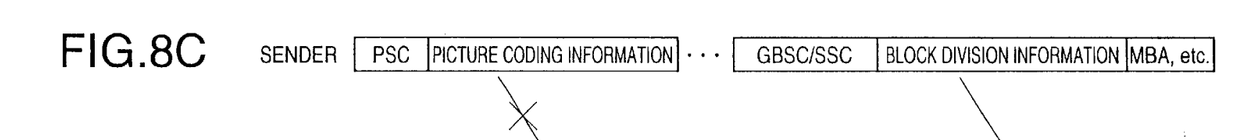
FIG. 8C is a diagram showing a bit stream at the sender side and FIG. 8D is a diagram showing a bit stream at the receiver side.
Figure 8D:
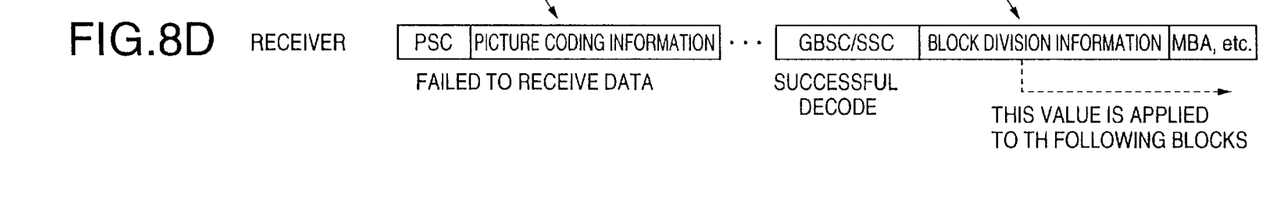

FIG. 8C is a diagram showing a bit stream at the sender side and FIG. 8D is a diagram showing a bit stream at the receiver side. A PSC is a synchronous code of the picture header and a GBSC/SSC is a block group loop or a synchronous code of the slice. It is assumed that the picture header is composed of picture coding information including a picture start code PSC as a synchronous code, an image size, a coding mode and so on. It is also assumed that the picture header can not be detected at the receiver side because of a transmission error. However, when the block division information is included at the sender side as shown in FIG. 8B, all block groups of data can be successfully decoded based on the block division information after at least one block group of data including the block division information is recognized at the receiver side.

It should be noted that the block division information should be added before the macroblock address MBA. In details, the macroblock address MBA varies its field length in accordance with the block division. By adding the block division information before the macroblock address MBA at the sender side, the block division information can be recognized at the receiver side without being affected by the field length and then the field length of the macroblock address MBA can also be recognized. Thus, when the block division information and the macroblock address MBA are properly recognized at the receiver side, the following block group data can be successfully decoded. Alternatively, by defining a fixed length between the synchronous code and the macroblock address MBA, it is possible to successfully recognize the block division information. That is to say, dummy codes, which are meaningless to the block division method and are used to fill some digits in accordance with the fixed length being recognized between the sender side and receiver side, may be inserted between the synchronous code and the macroblock address MBA.

Figure 9:
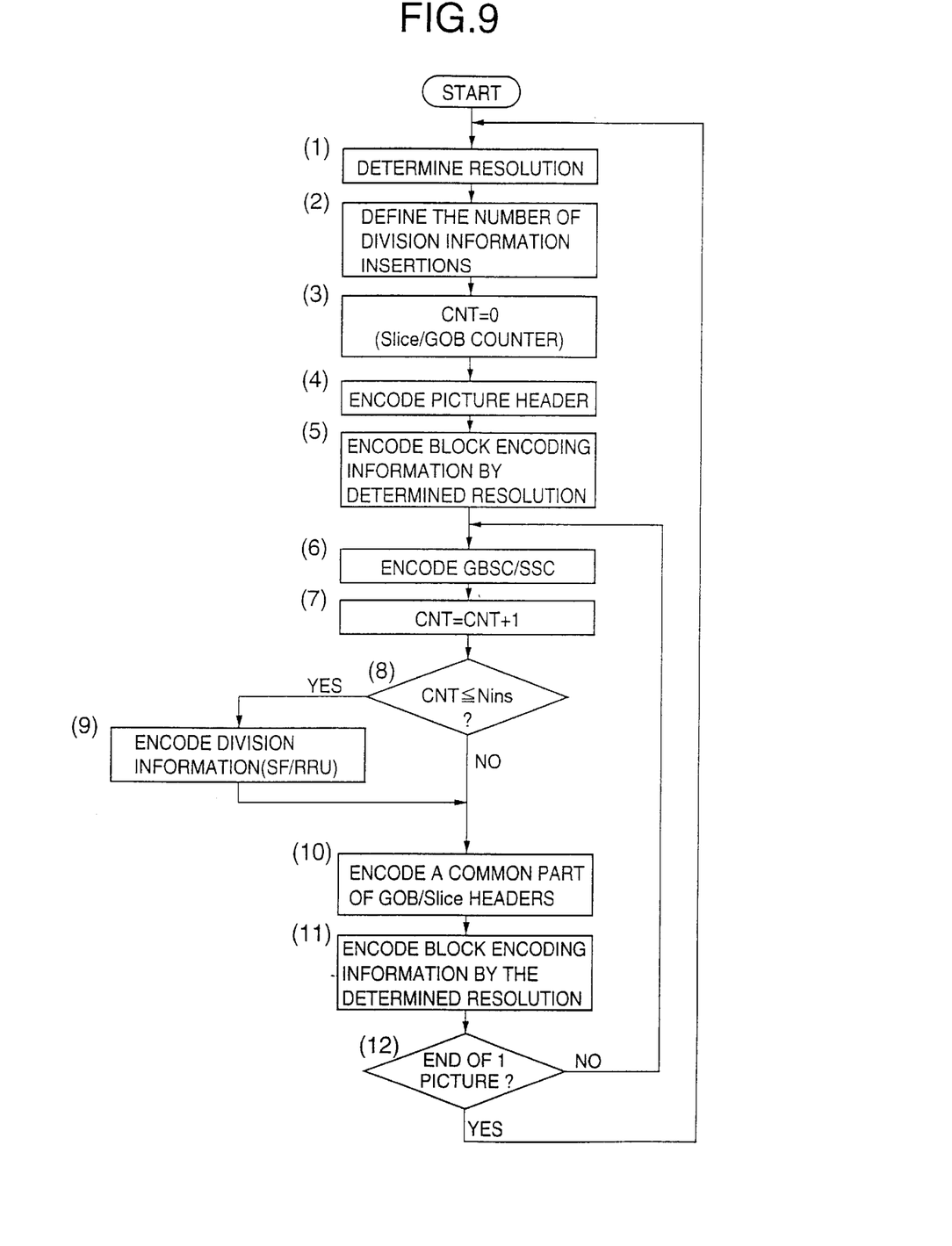
FIG. 9 is a flowchart for explaining the embodiment according to the present invention.

FIG. 9 is a flowchart for explaining the embodiment according to the present invention. A resolution for encoding a current image is determined in step (1) and the number of block division information insertions Nins is defined in step (2). The number of block division information insertions indicates how many GOB/slice (macroblock/slice) headers the division information is inserted into. Subsequently, a counter CNT that counts the number of block division information insertions Nins is set to zero in step (3).

Then, the picture header is encoded in step (4) and blocks are encoded in accordance with the determined resolution in step (5). Also, the GOB start code GBSC or the slice start code SSC are encoded in step (6). Subsequently, CNT=CNT+1, that is, the counter CNT is incremented by 1, in step (7). In step (8), it is judged whether the counter CNT is less than or equal to the number of block division information insertions Nins. When the counter CNT is less than or equal to the number of block division information insertions Nins, the division information (SF/RRU) is inserted in step 9.

In step (8), when the counter CNT is greater than the number of block division information insertions Nins or after step (9), the following codes are inserted in step (10): a common part GFID for GOB headers, the GQUANT or a common part MBA for slice headers, the SETPB2, the SQUANT, the SEPB3 and the GFID. And then, each block is encoded at the determined resolution in step (11). In step (12), it is checked whether it is the end of a picture or not. When it is end of the picture, the step (1) is performed to encode the picture. When it is not end of the picture yet, the step (6) is performed and the steps (7) through (12) are repeated.

As mentioned above, the block division information is inserted in all or sequence of a plurality of block group headers or slice headers at the sender side. Thus, at the receiver side, even when a transmission error occurs, it is possible to properly decode encoded image information after the block division information is recognized from at least one block group header or slice header.

Moreover, in this present invention, an error detection code or an error correction code is generated to guarantee the block division information and added at a position after the block division information in the header. Thus, it is guaranteed at the receiver side whether the block division information is affected by noises or not.

Furthermore, the block division information is inserted at a position in the header before any information which field length is affected by the insertion. Therefore, the block division information can be easily recognized at the receiver side.

The present invention is not limited to the specifically disclosed embodiments, variations and modifications, and other variations and modifications may be made without departing from the scope of the present invention.

The present application is based on Japanese Priority Application No. 11-072380 filed on Mar. 17, 1999, the entire contents of which are hereby incorporated for reference.

What is claimed is:

1. A dynamic image encoding apparatus comprising:
   an encoding part dividing each picture of an input image into a plurality of blocks and encoding each of said blocks into an encoded data block; and
   a control part determining at least one of a size of the picture and a size of the blocks so as to avoid an occurrence of an overload of information, said control part controlling said encoding part so as to make groups by grouping by a plurality of the encoded data blocks, to add a header including a synchronous code at the head of each of the groups to be transmitted, and to insert block division information indicating the possible size of the blocks at a position after the synchronous code in the header of at least one of the groups;
   wherein a code indicating whether said block division information is inserted or not is added at a position after each synchronous code.

2. A method for encoding a dynamic image comprising the steps of:
   dividing each picture of an input image into a plurality of blocks and encoding each of said blocks into an encoded data block;
   determining at least one of a size of the picture and a size of the blocks so as to avoid an occurrence of an overload of information;
   making groups by grouping by a plurality of the encoded data blocks;
   adding a header including a synchronous code at the head of each of the groups to be transmitted;
   inserting block division information indicating the possible size of the blocks at a position after the synchronous code in the header of at least one of the groups; and
   adding a code indicating whether said block division information is inserted or not at a position after each synchronous code.

3. A dynamic image encoding apparatus comprising:
   an encoding part dividing each picture of an input image into a plurality of blocks and encoding each of said blocks into an encoded data block; and
   a control part determining at least one of a size of the picture and a size of the blocks so as to avoid an occurrence of an overload of information, said control part controlling said encoding part so as to make groups by grouping by a plurality of the encoded data blocks, to add a header including a synchronous code at the head of each of the groups to be transmitted, and to insert block division information indicating the possible size of the picture at a position after the synchronous code in the header of at least one of the groups;
   wherein a code indicating whether said block division information is inserted or not is added at a position after each synchronous code.

4. The dynamic image encoding apparatus as claimed in claim 3, wherein said block division information is inserted into each of a predetermined number of groups in sequence from a beginning of the groups.

5. The dynamic image encoding apparatus as claimed in claim 3, wherein one of an error detection code and an error correction code for said block division information is added to each of said groups.

6. The dynamic image encoding apparatus as claimed in claim 3, wherein said block division information is inserted at a position before any information which field length is affected by the insertion.

7. A method for encoding a dynamic image comprising the steps of:
   dividing each picture of an input image into a plurality of blocks and encoding each of said blocks into an encoded data block;
   determining at least one of a size of the picture and a size of the blocks so as to avoid an occurrence of an overload of information;
   making groups by grouping by a plurality of the encoded data blocks;
   adding a header including a synchronous code at the head of each of the groups to be transmitted;
   inserting block division information indicating the possible size of the picture at a position after the synchronous code in the header of at least one of the groups; and
   adding a code indicating whether said block division information is inserted or not at a position after each synchronous code.

8. The method as claimed in claim 7, further comprising the step of inserting said block division information into each of a predetermined number of groups in sequence from a beginning of the groups.

9. The method as claimed in claim 7, further comprising the step of adding one of an error detection code and an error correction code for said block division information to each of said groups.

10. The method as claimed in claim 7, wherein said block division information is inserted at a position before any information which field length is affected by the insertion.

* * * * *

UNITED STATES PATENT AND TRADEMARK OFFICE
CERTIFICATE OF CORRECTION

PATENT NO. : 6,697,425 B1
DATED : February 6, 2004
INVENTOR(S) : A. Nakagawa et al.

It is certified that error appears in the above-identified patent and that said Letters Patent is hereby corrected as shown below:

<u>Title page,</u>
Item [30], Foreign Application Priority Data, please add the following:
-- March 17, 1999     (JP)     11-072380 --

Signed and Sealed this

Twenty-fifth Day of May, 2004

JON W. DUDAS
*Acting Director of the United States Patent and Trademark Office*